(12) United States Patent
Gutzeit

(10) Patent No.: US 11,646,982 B2
(45) Date of Patent: May 9, 2023

(54) MULTICHANNEL MESSAGING SYSTEM AND METHOD

(71) Applicant: LEAPXPERT LIMITED, Causeway Bay (HK)

(72) Inventor: Dmitry Gutzeit, Causeway Bay (HK)

(73) Assignee: LEAPXPERT LIMITED, Causeway Bay (HK)

( * ) Notice: Subject to any disclaimer, the term of this patent is extended or adjusted under 35 U.S.C. 154(b) by 0 days.

(21) Appl. No.: 17/647,316

(22) Filed: Jan. 6, 2022

(65) Prior Publication Data
US 2022/0200939 A1 Jun. 23, 2022

Related U.S. Application Data

(63) Continuation of application No. PCT/IB2020/056355, filed on Jul. 7, 2020.

(51) Int. Cl.
*H04L 51/04* (2022.01)
*H04L 51/56* (2022.01)
*H04L 51/02* (2022.01)
*H04L 51/06* (2022.01)
(Continued)

(52) U.S. Cl.
CPC .............. *H04L 51/04* (2013.01); *H04L 51/02* (2013.01); *H04L 51/06* (2013.01); *H04L 51/08* (2013.01); *H04L 51/18* (2013.01); *H04L 51/56* (2022.05)

(58) Field of Classification Search
CPC ......... H04L 51/04; H04L 51/02; H04L 51/06; H04L 51/08; H04L 51/18; H04L 51/56
See application file for complete search history.

(56) References Cited

U.S. PATENT DOCUMENTS

2014/0324993 A1 10/2014 Li et al.
2015/0193457 A1* 7/2015 Radhakrishnan ..... H04L 67/568
707/812
(Continued)

FOREIGN PATENT DOCUMENTS

| CN | 104202236 A | 12/2014 |
|---|---|---|
| CN | 104811371 A | 7/2015 |

(Continued)

OTHER PUBLICATIONS

International Preliminary Report on Patentability dated Jan. 11, 2022, for PCT Application No. PCT/IB2020/056355, filed on Jul. 7, 2020, 5 pages.

(Continued)

*Primary Examiner* — Austin J Moreau
(74) *Attorney, Agent, or Firm* — Morrison & Foerster LLP

(57) ABSTRACT

There is provided a communication system for communicating messages between a group comprising a plurality of user accounts on a plurality of communication channels. At least some user accounts operate on a first communication channel and at least some of the other user accounts operate on at least a second communication channel different to the first communication channel. A plurality of integration modules are provided, associated with a unique communication channel. Data stores retain user account identification information and membership in groups are accessible by a central messaging module to send and receive messages. A method is also provided for performing the same.

22 Claims, 5 Drawing Sheets

(51) Int. Cl.
*H04L 51/08* (2022.01)
*H04L 51/18* (2022.01)

(56) References Cited

U.S. PATENT DOCUMENTS

| | | | |
|---|---|---|---|
| 2015/0319127 A1* | 11/2015 | Allen | H04L 51/52 |
| | | | 709/206 |
| 2016/0212265 A1* | 7/2016 | Philonenko | H04M 3/5233 |
| 2016/0323235 A1 | 11/2016 | Lindsay et al. | |
| 2016/0352677 A1* | 12/2016 | Gordon | H04L 51/04 |
| 2019/0149489 A1* | 5/2019 | Akbulut | G06N 5/022 |
| | | | 709/206 |
| 2019/0197603 A1 | 6/2019 | Ku | |

FOREIGN PATENT DOCUMENTS

| | | |
|---|---|---|
| CN | 104993998 A | 10/2015 |
| CN | 105072093 A | 11/2015 |
| CN | 106533894 A | 3/2017 |
| CN | 107317741 A | 11/2017 |
| CN | 107888487 A | 4/2018 |
| CN | 108111401 A | 6/2018 |
| WO | 2016186484 A1 | 11/2016 |
| WO | 2016190726 A1 | 12/2016 |
| WO | 2018184199 A1 | 10/2018 |

OTHER PUBLICATIONS

International Search Report and Written Opinion dated Oct. 15, 2020, for PCT Application No. PCT/IB2020/056355, filed on Jul. 7, 2020, 8 pages.

\* cited by examiner

MULTICHANNEL MESSAGING SYSTEM AND METHOD

CROSS REFERENCE TO RELATED APPLICATIONS

The present application is a continuation application of International Application No. PCT/162020/056355, filed on Jul. 7, 2020, which claims benefit of Hong Kong Application No. 19126689.9, filed on Jul. 11, 2019, the contents of which are incorporated by reference herein in their entirety.

FIELD

The present disclosure relates to a system and method for facilitating communication via multiple messaging applications, especially in a group context.

BACKGROUND

Communication of information has rapidly developed from voice calls between two individuals which were connected via a human operator establishing a dedicated telephone circuit; to today's various messaging applications which can communicate text, emoticons, images and other information to groups of people, potentially wirelessly, instantaneously and across countries and around the world.

As well as communication between two individual "nodes", messaging applications also provide capability for group chat functionality, whereby users logged into their account on a particular messaging application can send/receive messages to/from all other members of the group who have the same messaging application. For example, a parent can communicate pictures of a child's birthday to all members of the family including members of the extended family (for example, both sets of grandparents) who have user accounts with a common messaging application. In a business context, a company could disseminate messages advising of a promotional event to a group in their customer base via a common messaging platform e.g. WhatsApp, LINE, WeChat, Messenger or the like.

It would be appreciated that the array of different messaging services available means a business has an array of different channels by which employees are communicating with their customers, many of whom are reluctant or unable to install another messaging client on their device, which may be a desktop computer, laptop, portable electronic device such as a smartphone or tablet computer. In sensitive regulatory environments including legal, financial or government businesses/organisations it is critical that there is some way of monitoring communication over these channels for compliance and record keeping purposes.

Typically, any groups with whom an organisation is interacting with via its employees are usually specific to a particular messaging application, with each application therefore requiring administration of the group membership by the organisation. For example, if an organisation establishes a Line™ account by which one or more staff members interacts with various customers and customer groups; a separate account must be established on WeChat and the WeChat™ application installed in order to send and receive messages from customers and groups who only utilise the WeChat™ application. The number of potential applications and accounts adds additional complexity for organisations to establish and maintain appropriate procedures to communicate over all of the various channels employees can use to send and receive information throughout their daily business interactions.

Accordingly, it is object of the present disclosure to address or at least partially ameliorates at least addresses some of the above deficiencies of the prior art.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims.

In accordance with a first aspect, there is provided a communication system for communicating messages between a group comprising a plurality of user accounts on a plurality of communication channels, wherein at least some user accounts operate on a first communication channel and at least some of the other user accounts operate on at least a second communication channel different to the first communication channel, the system comprising:

a plurality of integration modules wherein at least one or more integration modules are associated with a unique communication channel of the plurality of communication channels;

at least one or more data stores for retaining user account identification information and membership of at least some of the user accounts in at least one or more groups;

a central messaging module communicatively coupled to the at least one or more data stores and configured to send and receive messages from any one of the user accounts of a group via the at least one or more corresponding integration modules of the other user accounts in that group.

The identification information of the user account may include identification of the communication channel associated with the specified user account.

The user account identification information for a specified user account may include account identification information for that user account on the central messaging module and account identification information of that user account on the specific communication channel.

In particular account identification information of that user account on the specific communication channel is accessible to the central messaging module via the or each integration module of the network associated with that user account.

The central messaging module may be configured to store in at least one or more data stores all messages transmitted between the user accounts of a group and may associate each user account of a group with the or each corresponding integration module for sending and receiving messages to the group.

The central messaging module may include a pre-determined set of commands comprising an interface, and each of the corresponding integration modules are configured to receive the predetermined set of commands and issue corresponding communication channel specific commands.

The communication channels may be instant messaging applications capable of transmitting and receiving messages to and from user accounts thereof.

The communication channels may comprise instant messaging applications selected from the group comprising WeChat, WhatsApp, LINE, Telegram, Viber, iMessage, Facebook Messenger, RCS, Short Message Service, Kakao Talk.

The central messaging module may further include an access control module, which constrains user access to messages of at least one or more of the groups.

Optionally, at least one or more of the users may be an automated bot application communicatively coupled to the central messaging platform.

The automated bot application may be configured to provide predetermined responses on the occurrence of one or more trigger events in the group chat.

The system may further include an administration module by which the association of the plurality of user accounts with one or more groups is managed.

The plurality of user accounts may comprise a first user using a first communication channel and a second user using a second communication channel, wherein the first communication channel and second communication channel are different.

The message may include user account details appended or prepended thereto for display on the communication channel.

The internal messaging module may be configured to receive a message which includes predetermined set of messaging commands over a first communication channel and issue corresponding commands on a second communication channel.

In a further aspect there is provided a method of communicating messages between a group comprising a plurality of user accounts on a plurality of communication channels, wherein at least some user accounts operate on a first communication channel and at least some of the other user accounts operate on at least a second communication channel different to the first communication channel, the method comprising:

associating at least one integration module with each channel of the plurality of communication channels;

storing in at least one or more data stores user account identification information and membership of at least some of the user accounts in at least one or more groups;

sending and receive messages from a central messaging module communicatively coupled to the at least one or more data stores, wherein said messages are transmitted and/or received from any one of the user accounts in a group via the at least one or more corresponding integration modules of the other user accounts in the group.

The identification information of the user account may include identification of the communication channel associated with the specified user account and may include account identification information for that user account on the central messaging module and account identification information of that user account on the specific communication channel.

Preferably the user account identification information for a specified user account on the specific communication channel is accessible to the central messaging module via the or each integration module of that user account.

The central messaging module may store in at least one or more data stores all messages transmitted between the user accounts of a group.

The central messaging module may be configured to associate each user account of a group with the or each corresponding integration module for sending and receiving messages to the group.

The central messaging module may include a pre-determined set of commands comprising an interface, and each of the corresponding integration modules are configured to receive the predetermined set of commands and issue corresponding communication channel specific commands.

The communication channels may be instant messaging applications capable of transmitting and receiving messages to and from user accounts thereof and may be instant messaging applications selected from the group comprising WeChat, WhatsApp, LINE, Telegram, Viber, iMessage, Facebook Messenger, RCS, Short Message Service, Kakao Talk.

At least one or more of the users of the user accounts may be an automated bot application communicatively coupled to the central messaging platform, optionally configured to provide predetermined responses on the occurrence of one or more trigger events in the group chat.

The plurality of user accounts may be associated with one or more groups in an administration module. At least one or more of the messages may include the user account details appended or prepended thereto for display on the communication channel.

In a further aspect there is provided a non-transitory computer readable medium comprising program code, which when executed by a processor causes an apparatus to:

receive a message from a user account of a first messaging application in a group via a network interface for transmission to at least one other user account in the same group, wherein the at least one other user account in the same group is on a different messaging application to the first messaging application.

select an integration module from a plurality of integration modules according to user account identification information for transmission of the message via the selected integration module to the at least one other user account.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

Preferred embodiments of the present invention will be explained in further detail below by way of examples and with reference to the accompanying drawings, in which:—

DETAILED DESCRIPTION OF THE PREFERRED EMBODIMENTS

Figure 1:
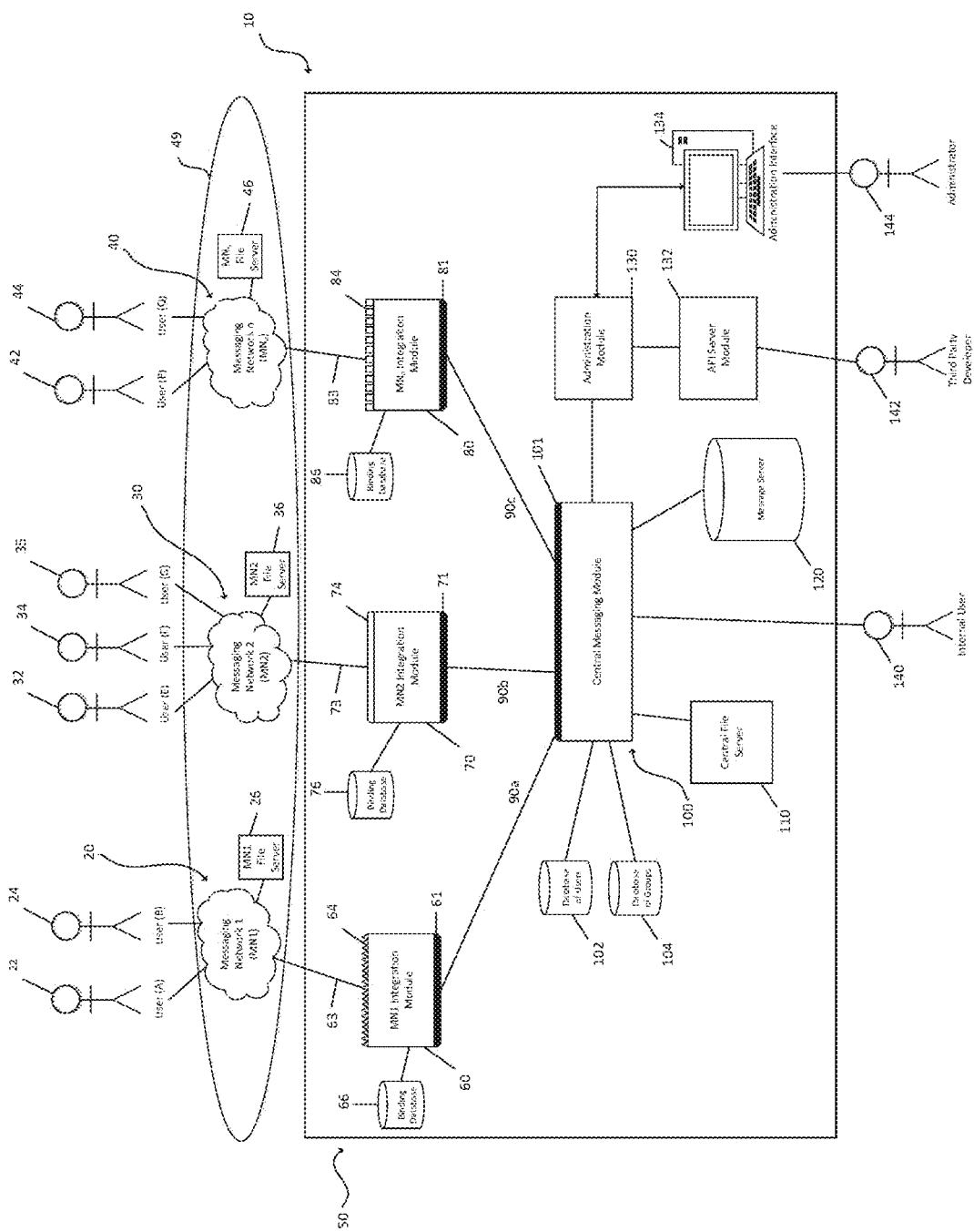
FIG. 1 depicts the schematic architecture of an embodiment of the system of the present disclosure.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

The disclosed technology addresses the need in the art for messages to be disseminated from, to and between members of a predefined group even if the members of the group are using different communication channels. It would be appreciated that a group may comprise two or more members.

In an embodiment of the present disclosure the communication channels may be user accounts on separate messaging client applications supported by a dedicated backend platform specific to the channel in question. Optionally, it would be appreciated that the applications could be any one or more of messaging applications, including instant messaging applications selected from the group comprising WeChat, WhatsApp, LINE, Telegram, Viber, iMessage, Facebook Messenger, RCS, Short Message Service, Kakao Talk or similar.

In the embodiment described, it would be appreciated that the various messaging applications are likely to have different user interfaces and are based upon different underlying software frameworks or platforms that may be proprietary to that platform. Advantageously, the messaging applications may be operable on portable electronic devices such as smartphones or tablet computers as either native applications or web based applications; providing an interface to a user for receiving various types of input from the user via the hardware of the device.

As described herein in further detail, through the operation of the disclosed system a user having an account on a first messaging platform is able to participate in a chat with users having accounts on other messaging platforms, typically in a logical conversation stream between all members of the group. The transmission and reception of messages between members of a group constitutes a series of messages generated in a specific time sequence, and in order to maintain coherence and logic in such a conversation generally such messages are communicated and displayed in an appropriate order, which is usually although not exclusively time series based.

It would further be appreciated that the messages may contain items of additional content above and beyond text, including documents, music files, movie files, pictures, etc. which may be embedded or otherwise included in the transmitted message. Alternatively, the message may contain identification of a file or a group of files that are stored on a remote data server accessible over a network. On receiving such a message an application may enable its user to download the file or files from the remote location. The message may, for example, include a uniform resource locator (URL) identifying the location at which the file or files are accessible over the internet. The file could be, for example, PDFs, MP3 files, audio files, video files, images etc.

Referring to FIG. 1, there is depicted an exemplary communication system according to an embodiment of the present disclosure.

User A 22 and user B 24 have accounts on a first messaging network 20. Associated with the first messaging network is a file server 26 on which files accessible to users of that network are stored. It would be appreciated that the same messaging client may be used by users A and B but may be operable on various types of terminal devices, including portable electronic devices or laptops or desktop computers. These devices would provide software applications which enable users to log in to their specific accounts on that messaging network and communicate messages to, from and between other users on the same messaging network as is known in the art. For the embodiment depicted; this messaging network 20 could be WhatsApp; although it would be appreciated that this is an arbitrary designation.

Referring to the second messaging network 30, user E 32, user F 34 and user G 35 each have unique messaging accounts on this messaging network which are accessible via applications operating on terminal devices such as portable electronic devices, laptops or desktop computer systems. Similarly, as with the first messaging network 20, a messaging file server 36 is associated with the second messaging network, providing the facility to store messages and files associated with or embedded with messages transmitted by, to and between users of messaging network 2. For the embodiment depicted; this messaging network could be WeChat; although it would be appreciated that this again merely an arbitrary designation.

Finally, user P 42, user Q 44 operate on messaging network 40 similarly operate their user accounts on messaging applications accessible on terminal devices which may include portable electronic devices, laptops or desktops. As with the first and second messaging networks, messaging network 40 has an associated messaging network file server 46 by which files transmitted to and between members of that network may be stored.

It would be appreciated that the present disclosure provides a means and system by which messages between each of the first 20 messaging network, second messaging network 30 and $N^{th}$ messaging networks 40 can be communicated by, to and between users of the respecting networks through the operation of the communication system 10 of the present disclosure. Client applications for one communication channel or messaging network may be operable on various electronic devices (e.g. WhatsApp on a smartphone, tablet and laptop computer) in existing systems. However, in contrast to existing systems, the present disclosure provides a means for a WhatsApp user in a group to communicate with a WeChat user in the same group, without installing a separate or additional application. As such, the present disclosure provides a seamless interconnection of previously separate messaging applications which were previously constrained within users with accounts in one messaging network.

The messages transmitted from the internal user to the various users of the messaging platforms as well as the messages received from the users of the various messaging platforms may include pre-pended or appended user account details which are automatically sent and stripped and/or processed by the respective messaging networks prior to dissemination on the central messaging network.

The multi-channel communication method and system of the present disclosure is facilitated by the central messaging platform 50 which includes a first integration module 60 for integration between the first messaging network 20 and the central messaging module 100. Similarly, a second network integration module 70 provides an interface between the second messaging network 30 and the central messaging module 100. Finally, a $N^{th}$ integration module 80 is depicted for providing integration between the central messaging module 100 and the $N^{th}$ messaging network 40.

Additionally, and including an exemplary schema as depicted below in Table 1, binding databases 66 for the first messaging network 76 for the second messaging network and 86 for the $N^{th}$ messaging network are associated with the various integration modules. These binding databases store an association between the messaging network account identifier of the various user accounts on the various user messaging network with a user ID on the central messaging platform which is created as discussed in more detail below.

TABLE 1

Binding Databases

MN1 Integration Module Binding Database

| Central User ID | Messaging Network 1 Account Number (e.g. WhatsApp) |
|---|---|
| CM001 | +86 12346453 |
| CM003 | +852 123456 |
| ... | ... |

MN2 Integration Module Binding Database

| Central User ID | Messaging Network 2 Account Identifier (e.g. WeChat) |
|---|---|
| CM002 | Wang_zp_123 |
| CM004 | Lee_CL_66 |
| ... | ... |

It would be appreciated that the term "database" refers to the function performed by the respective binding databases 66, 76 and 86 rather than the physical manifestation thereof. As such, the "database" may refer to a logical database defining the logical structure and relationship between the above associations and may be stored across various pieces of hardware including one or more service. Alternatively, the term "database" may also refer to storage of database in an unstructured form, again one or more physical pieces of hardware such as one or more service. It would be appreciated that the various integration modules 60, 70, 80 include a database management system for facilitating the corresponding database analysing and obtaining results obtained. This database management system may be part of the integration module or may be executed on dedicated hardware without departing from the scope of the present disclosure.

Each of the respective integration module 60, 70, 80 have interfaces 64, 74, 84 which translate commands to/from the central messaging network and the messaging network with which they are in communication. It would be appreciated that these interfaces may be communicatively coupled to the messaging network across links 63, 73, 83 via standard wired or wireless network communications. It would be appreciated that these interfaces 64, 74, 84 are implementations of the API exposed by the messaging networks for the specific networks. For example, the interface 64 could be configured to provide commands and appropriate variables to the WhatsApp API; whereas interface 74 issues commands and variables in a format compliant with the WeChat API etc.

Similarly, the various integration modules 60, 70, 80 have corresponding interfaces 61, 71, 81 for interacting with an interface 101 of the central messaging module 100. It would be appreciated that the content of these interfaces is consistent across each of the various integration modules as represented by the common interfaces 61, 71, 81.

These interfaces to the integration modules are configured for sending and receiving messages to and from the central messaging module 100 via communication links 90a, 90b and 90c which may be wired or wireless communication links without departing from the scope of the present disclosure.

Messages may be passed through interface 101 of the central messaging module 100 and are the means by which standard messaging commands and contents are transmitted from the central messaging module 100 to the corresponding integration module.

Also, in communication with the central messaging module 100 is a database of users 102 and a database of groups 104.

As with the binding databases 66, 76 and 86, the database of users and of groups refer to the association rather than the physical manifestation thereof. As such, the "database" may refer to a logical database defining the logical structure and relationship between the above associations and may be stored across various pieces of hardware including one or more service. Alternatively, the term "database" may also refer to storage of database in an unstructured form, again one or more physical pieces of hardware such as one or more service. It would be appreciated that the various database of users 102 and of groups 104 include a database management system for facilitating access to the corresponding database and analysing results obtained. This database management system may be part of the integration module or may be executed on dedicated hardware without departing from the scope of the present disclosure.

It would be appreciated that the database of users contains an association between the user ID allocated upon establishment of that user ID in the central messaging platform and an indication as to what messaging platform this user account is associated with. For example, in the embodiment depicted, it would be appreciated that user ID CM001, CM003 are associated with Messaging Network 1 (and being ultimately resolvable by the binding database of Messaging Network 1 to user accounts A and B respectively as noted above in Table 1).

TABLE 2

Central Database of Users

| INTERNAL USER | Association with Messaging Network |
|---|---|
| CM001 | MN1 |
| CM002 | MN2 |
| CM003 | MN1 |
| CM004 | MN2 |
| CM005 | $MN_x$ |
| CM006 | $MN_y$ |

The above association between the user accounts and the respective messaging networks utilised could be stored in the user database 102.

In the database of groups, each of the respective users may be associated with a plurality of groups, for example, as shown in the following Table 3a, user CM001 may be associated with Group 1 and Group 2 represented by $G_1$ and $G_2$. (This user would ultimately be resolvable to User A of Messaging Network 1 by the binding database associated with Messaging Network 1).

User CM003 may be associated with $G_1$. User CM002 may be associated with $G_2$, $G_5$. User CM004 may be associated with $G_1$, $G_2$ and $G_3$. User CM005 associated with $G_3$, $G_4$ and $G_5$ and user CM006 associated with $G_3$, $G_4$. User CM007 associated with $G_5$ and $G_1$. It would be appreciated that these associations are essentially arbitrary and many other combinations would be possible without departing from the scope of the present disclosure. (Similar resolving of the central user account identification codes to accounts on the various messaging networks could also readily be appreciated).

The corresponding table sorted by users is shown below for each of the respective groups; as Table 3a, with group IDs in Table 3b. It would also be appreciated that this group membership could be dynamically changed and administered by the central messaging module 100.

TABLE 3a

| USER | GROUP MEMBERSHIP |
| --- | --- |
| CM001 | $G_2$ |
| CM003 | $G_1$ $G_2$ $G_5$ |
| CM002 | $G_2$ $G_5$ |
| CM004 | $G_1$ $G_3$ |
| CM005 | $G_3$ $G_4$ $G_5$ |
| CM006 | $G_3$ $G_5$ |
| CM007 | $G_5$ |

TABLE 3b

| GROUP ID |
| --- |
| Group 1 - XYZ Analyst |
| Group 2 - ABC Analyst |
| Group 3- Materials Analysts |
| Group 4- Finance Analysts |
| Group 5- Project Zebra |
| Group 6- Project Alpha |

Also in communication with the central messaging module 100 is a central file server 110. It would be appreciated that this central file server 110 may store the associated files transmitted to, from and between participants in the group conversations facilitated by the messaging platform of the present disclosure.

The central messaging module 100 may also be communicatively coupled with a message server 120 on which the messages transmitted to, from and between the user accounts on the platform may be stored as is discussed in more detail below. Finally, the central messaging module 100 may be communicatively coupled with an administration module 130 which in turn is coupled to an application programming interface server module 132 by which third party developers 142 may interact with those central messaging module 100. Similarly, the administration module 130 is in communication with an administration interface 134 by which an administrator 144 may look after administrative functions of the central messaging platform.

These administrative functions may include but are not limited to creation, addition, modification of user profiles on the central messaging module; management of the association of users for the integration modules to handle communication with messaging networks and management and administration of groups and administration of groups.

Daily operations of the central messaging platform 50 may be performed by an internal user 140 operating an application using standard hardware such as a keyboard mouse, touchscreen etc.

Figure 2B:
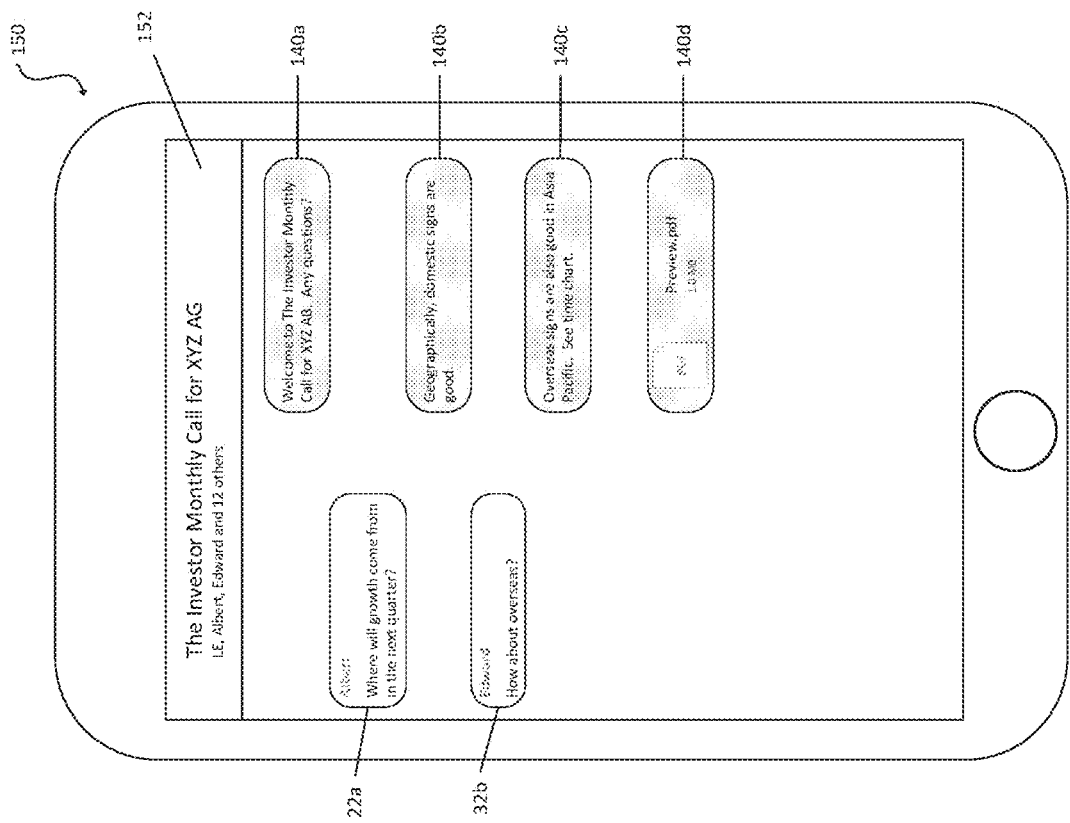
FIG. 2B depicts an exemplary representation of a simplified chat or conversation as it would appear to the user when using the system of the present disclosure.
Figure 2A:
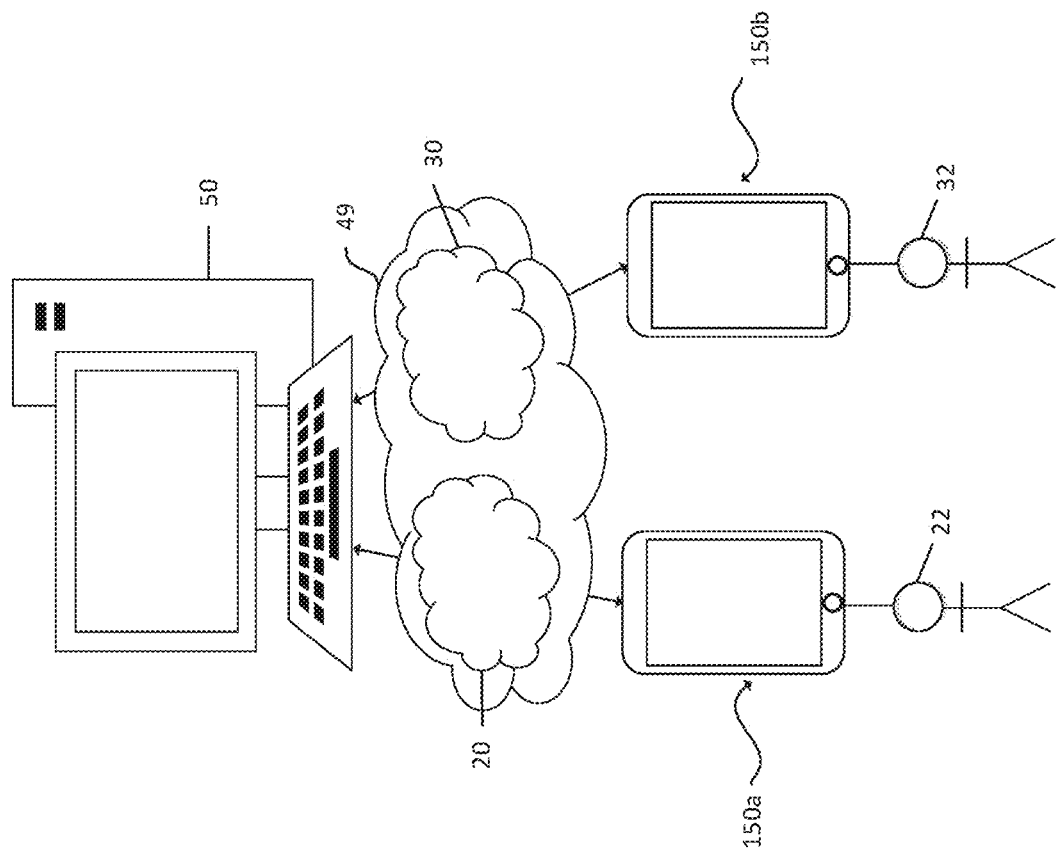
FIG. 2A depicts an exemplary representation of a simplified schematic architecture of the present disclosure as it would appear to the user.

Referring to FIG. 2A, there is depicted an exemplary representation of a simplified schematic architecture of the present disclosure as it would appear to a user. As depicted, user A 22 operates a portable electronic device 150a on which is stored a messaging application on which they have established an account, to operate a messaging network 20. This messaging application communicates across a communications network 49 with a messaging platform/server (not shown) which administers communications with, to and between participants having accounts on messaging network 20.

Similarly, user E 32 has a portable electronic device 150b upon which a further messaging application (different to the messaging application of the first user) and which their user account is established. For the purposes of the example this user account is on a different messaging network 20 on which the account of user A 22 is operable.

Both messaging network/communication channel of user A 22 and the messaging network/communication channel of user B 30 are in communication with the central messaging platform 50 of the present disclosure. As is discussed in more detail, this arrangement enables the hitherto separate user account of user A 22 executing on the application on the portable electronic device 150a to communicate with the user account of user B 32 executing on the portable electronic device 150b on the application and stored via the respective networks and through the communication interface by the central messaging module 100 of the present disclosure.

Similarly, referring to FIG. 2B, there is depicted an exemplary view of what the user of the portable electronic device would see when using their messaging application or communication channel or messaging platform of choice which is supported by the system of the present disclosure. At 152, the specific name of the group is specified, this group being established administrator 144 (or appropriately authorised internal user 140) of the central messaging module who may also be responsible for associating users with specific groups as previously discussed, as well as establishing unique user IDs for each of the users of the various platforms for that user on the central platform.

As depicted, the initial message in the time sequence of the conversation is transmitted by the internal user 140, this message being labelled 140a. In this case, message 22a in response is transmitted from Albert, user A on a first messaging network 20. Albert's first question in response to message 140a is communicated to all members of the group established by the internal user 140. That is, Albert's message 22a is communicated both to the internal user 140 and to user E 32 on a second messaging network as well to all other users in the first messaging network and the second messaging network.

As shown, the internal user 140 responds with a message 140b, to Albert's question. Similarly, this message is disseminated across all users in the group, including Albert on Messaging Network 1 and Edward (User E) on Messaging Network 2.

Edward then poses a question 32b in the group chat, with this message again disseminated. The internal user responds to Edward's question in message 32b, with a message 140c attaching a file 140d.

It would be appreciated that as shown, messages from Albert, Edward and the internal user or host of the call are communicated across messaging platforms to each of the respective users in the time sequence depicted.

These messages may be stored on the message server of the central messaging platform messaging server 120 with the attached file 140*d* stored on the central file server 110, and disseminated to the various networks, network 1 and network 2 of Albert and Edward as is described in more detail below and dependent on the specific arrangement of the specific messaging network.

Optionally, the file(s) 140*d* may be disseminated by uploading the file(s) 140*d* to servers of the individual messaging network, and then sending a message to inform the users (Albert and Edward) of the location of the file(s) 140*d* on the servers of the respective networks for that messaging platform.

Alternatively, the file(s) 140*d* may be uploaded to an file server on the central messaging network, and a link to this location on the central messaging network may be disseminated to users (Albert and Edward), such that they can navigate to this location and obtain the file.

Figure 3A:
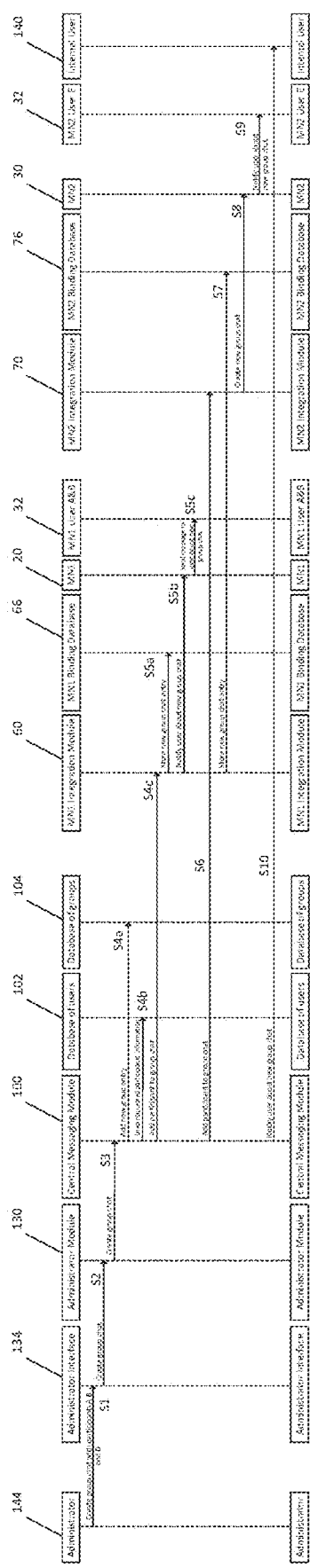
FIG. 3A depicts the various steps in the establishment of a group in accordance with an embodiment of the present disclosure.

Referring to FIG. 3A, a flow diagram of the various steps in the establishment of a group chat between a plurality of users using a plurality of communication channels or messaging networks is depicted.

The administrator 144 has received instructions (e.g. from an appropriately authorised manager) to create a group chat; including specified user account A 22, user account B 24 and user account E 32. This group may be created by operation of the administrator interface 134 of the administrator module 130 in Step S1. The administrator module 130 is in communication with the central messaging module 100 as shown in Step S2.

A new group entry is created in Step S4*a* in the database of groups, and in Step S4*b* the participant information is loaded from the database of users (identifying the user ID on the central messaging network and corresponding binding database to be contacted for that user).

The central messaging module then proceeds to contact the first messaging network integration module 60 which stores members of the specified group chat on that messaging network in Step S5*a*; and which also subsequently disseminate messages to the new group chat group in Step S5*b*. A message notifying the group members of the existence of the group may be then sent to participants A and D. Effectively responsibility for transmission of subsequent messages in then passed from central messaging module to Messaging Network 1 to communicate this message to users A and B, via that Messaging Network 1.

Similarly, the central messaging network sends the proposed group chat establishment for user E 32 to the messaging network to integration module, once it has determined that user E belongs to the Messaging Network 2. Once there, the new group chat membership is stored in Step S8 for Messaging Network 2, establishing the new group chat membership on the messaging network 30. In Step S9, the user is notified about the new group chat, and subsequent messages may be disseminated. In Step S10, the internal user who is also a member of the new chat group which has been established is also notified.

Figure 3B:
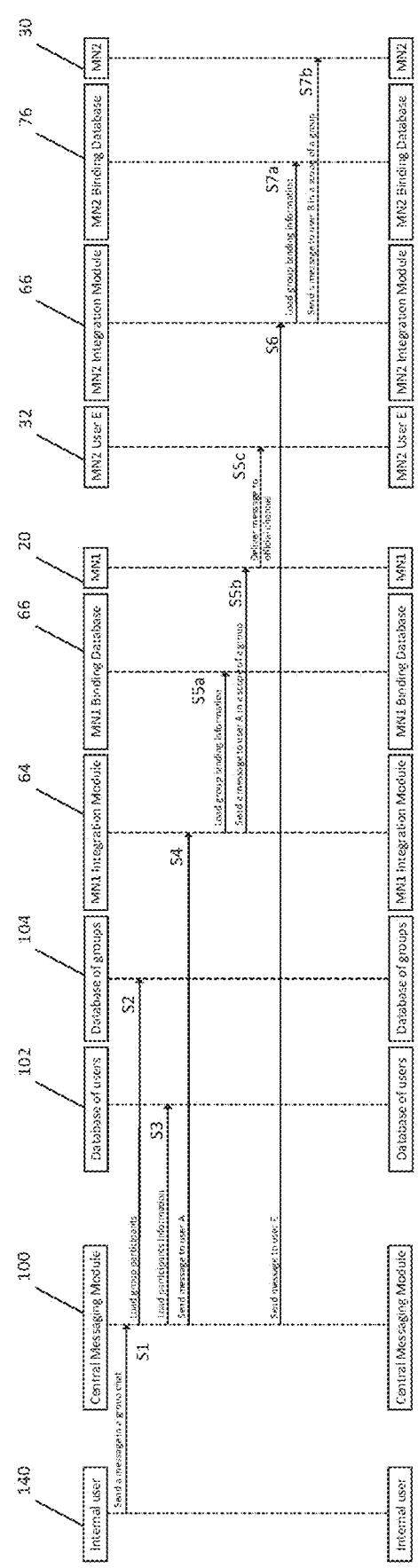
FIG. 3B depicts the various steps in transmission of a message in a group chat by a user who has been established in the system in accordance with an embodiment of the present disclosure.

Turning now to the schematic flow diagram for the transmission of a message amongst the group chat depicted in FIG. 3B is described in more detail. Once the various integration modules have been alerted to the establishment of a new group chat including at least some user accounts on their network, the integration modules are configured to receive, store, and transmit appropriate messages to the respective user accounts.

Accordingly, as shown, at Step S1, an internal user 140 sends a message to members of an established group chat via the central messaging module for distribution to all members regardless of which messaging network the members are using.

At this point, the internal user does not need to know or indeed care which messaging network or communication channel the various users in the group are using, as the system and the administrator are responsible for maintaining and updating respective group memberships, user IDs, associations and mapping between messaging networks and user identification. Of course, it would be appreciated that where the internal user is also the administrator, appropriate administration privileges would be conferred. In the embodiment depicted, the internal user is a daily operation personnel member with limited access rights, whereas the administrator is more of a backend system administrator.

Upon selecting a specific group ("Group ABC analysts") to whom the internal user wishes to send a message, the membership of the relevant group participants is determined by accessing the group database in Step S2. In this case, members CM001, CM002, and CM0003 are determined to be members of the Group 2 ABC analysts group.

Next, for each of the participants in this group, the appropriate messaging network to receive the message based upon the central user ID of the respective user accounts is identified. This identification is performed by accessing the central database of users 102 in Step S3, as shown in Table 2.

The appropriate message is then sent to the messaging network integration module, in this Messaging Network 1 integration module 64 (for users CM001, CM003) and integration module 74 (for users CM 002).

Dealing first with Messaging Network 1, messaging network integration module 64 accesses the binding databases 66 of central user IDs and user accounts on that relevant messaging network (either as a representation of a dedicated group chat on that network or using a named instance of a group name prepended to an incoming chat) in Step S5*a*.

Thus, as the specific account name for the members of the group on Messaging Network 1 is determined, the message can be distributed to the user account corresponding to CM001, CM003 on Messaging Network 1, in this case Users A (+86 12346453), C (+852 123456) (referring to Table 1) on Messaging Network 1.

The central messaging module 100 then communicates similarly with Messaging Network 2 integration module 66 in Step S6, which in turn loads group binding information in Step S7*a* for all members of that group which are on Messaging Network 2; in this case just user account CM002.

Once the association between that user ID and the user account on that messaging network is determined, a message is sent to user E (Wang_zp_123) within the scope of that group in Step S7*b*.

In this way, the internal user is able to communicate with the central messaging module which in turn determines and encourages delivery of that message to all members of the group which use that messaging network.

It would be appreciated that the specific details of the user account and an association with an internal user ID are stored at the binding database of the respective integration modules. Similarly, in the database of users, the association between the central user ID and the appropriate messaging network integration module is also logged. Finally, the database of groups associated with the central messaging module 100 stores the association of the central user ID with one or more groups to which that specific user belongs.

It would be a similar process by which an authorised user account on Messaging Network 1 (e.g. CM003) can send messages to other members of a group (e.g. Group 5 Project Zebra) (referring to Table 3a including CM002, CM005, CM006); whereby the central messaging module determines the appropriate integration module for the specified user account for handling that message and communicates it accordingly.

Advantageously, the central messaging module may be configured to store all messages transmitted between the user accounts of the group on a message server 120. Optionally, the messages for a specific group may be monitored by an anonymous software application, or by an administrator with appropriate access 144. Certain keywords or trigger words may be flagged in the group conversations. For example, in a financial institution, a bot could be configured to look for all SELL recommendations issued by on whatever communication network to all or specific groups by analysis of the various group chats or discussions which are recorded.

Optionally, the communication channels may be selected from the group comprising WeChat, WhatsApp, LINE, Telegram, Viber, iMessage, Facebook, Messenger, RCS, Short Message Service or Kakao Talk.

It would be appreciated that the separation between the internal user and the administrator may be facilitated by an access control module to manage user access to messages of the group conversations.

As disclosed herein, the present application provides a way in which the features of various messaging platforms are accessible across platforms to all members of a group, irrespective of the messaging platform used by the specific members of that group.

For example, for a simple text message on an exemplary messaging platform, the WhatsApp messaging platform welcoming participants to the group, the output from messaging network integration module to the WhatsApp API could be something similar to the below.

```
WhatsApp:
POST /v1/messages
{
    "recipient type": "group",
    "to": "whatsapp-group-id",
    "type": "text",
    "text": {
        "body": "Hello, welcome to group ABC Analysts"
    }
}
```

Similarly, the same message welcoming participants to the same group chat on WeChat could appear as below:

```
{
    "touser":"OPENID",
    "msgtype":"text",
    "text":
    {
        "content":"Hello welcome to group ABC Analysts"
    }
}
```

Accordingly, once a user of a messaging platform supported by the central messaging platform of the present disclosure is established on the central messaging platform, allocated to a group and appropriate entries made in the database of users 102, database of groups 104 and the relevant binding data store of the appropriate messaging network; they can then participate in the group chat, and interchange messages and files via the central messaging platform with and between other users of the messaging platform, irrespective of the messaging network on which the specific users have user accounts.

Figure 4A:
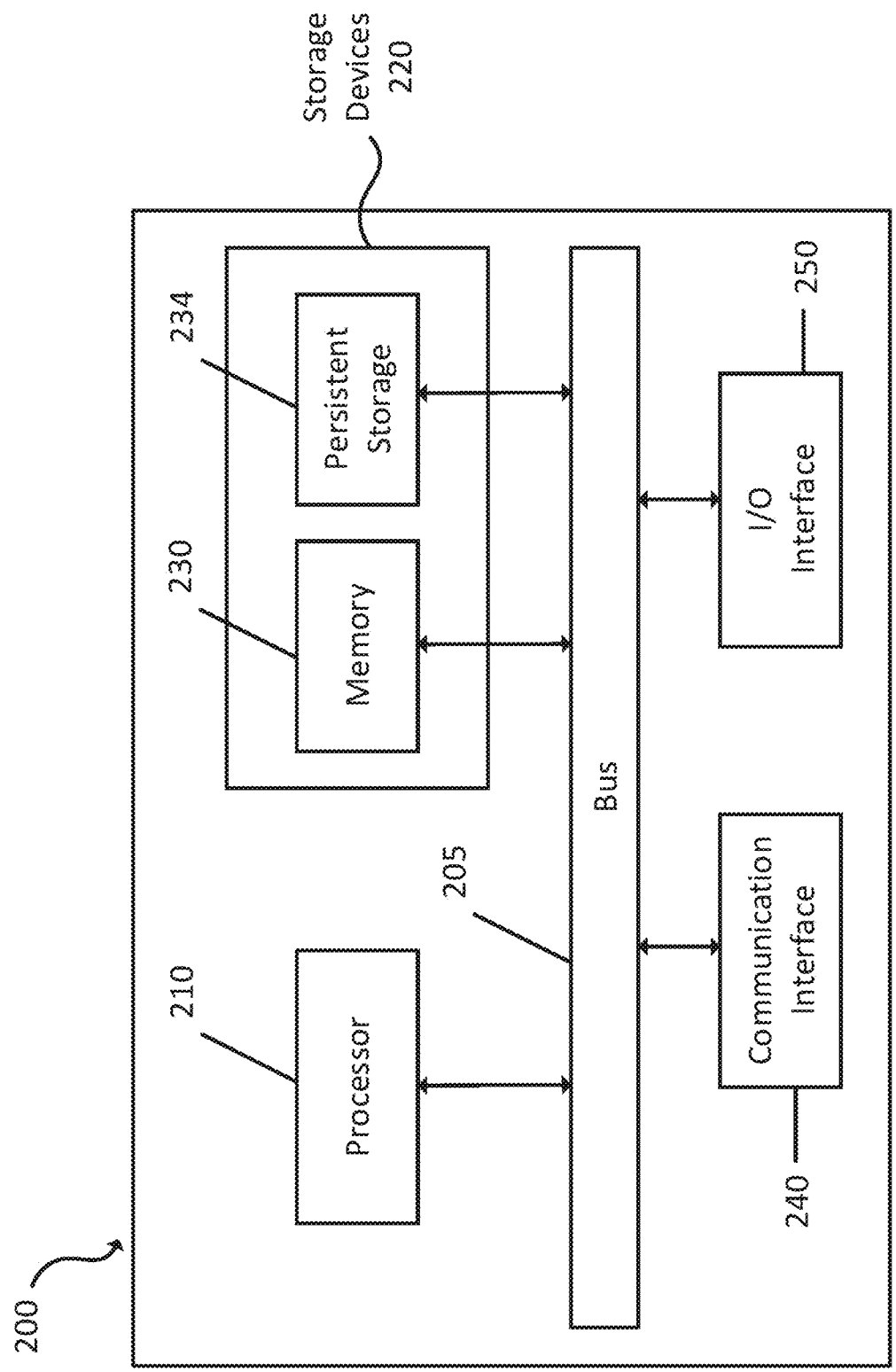
FIG. 4A depicts an exemplary architecture for a device or device(s) 200 for providing a messaging platform 50 operable by an internal user 140, a third party developer 142 or an administrator 144 according to various embodiments of the present disclosure.

FIG. 4A depicts an exemplary architecture for a device or device(s) 200 for providing a messaging platform 50 operable by an internal user 140, a third party developer 142 or an administrator 144 according to various embodiments of the present disclosure.

The device 200 may be a single standalone device, or a device providing server functionality (for example, a gateway server), on which one or more database servers are also operable. Alternatively, device 200 could comprise multiple machines, for example, a server communicatively connected to one or more database servers and other modules. In still further embodiments, device 200 and databases and modules may be entirely provided on a cloud computing platform.

As depicted in FIG. 4A, device 200 includes a bus 205 for supporting communication between at least one processor 210, at least one storage device(s) 220, at least one communication interface 240, and at least one input/output (I/O) interface 250.

The processor 210 executes instructions that are stored in a memory 230. The processor 210 may include any suitable number(s) and type(s) of processors or other devices in any suitable arrangement. Example types of processing devices 210 include microprocessors, microcontrollers, digital signal processors, field programmable gate arrays, application specific integrated circuits, and discrete circuits.

The memory 230 and a persistent storage 234 are exemplary storage devices 220 indicative of structure(s) capable of storing and facilitating retrieval of information (such as data, program code, or other suitable information on a temporary or permanent basis). The memory 230 can be a random access memory or any other suitable volatile or non-volatile storage device(s). The persistent storage 234 may comprise one or more components or devices supporting longer-term storage, including databases or interfaces to databases embodied on separate machines and/or may include a read only memory, hard drive, flash memory, or optical disc(s).

The communication interface 240 provides communications with other systems or devices. For example, the communication interface 240 could include a network interface card or a wireless transceiver facilitating communications over the network. The communication interface 240 may be configured to support communications through any suitable physical or wireless communication link(s).

The I/O interface 250 provides input and output of data. For example, the I/O interface 250 can provide a connection for user input through a keyboard, mouse, keypad, touchscreen, or other suitable input device. The I/O interface 250 can also send output to a display, printer, or other suitable output device.

Figure 4B:
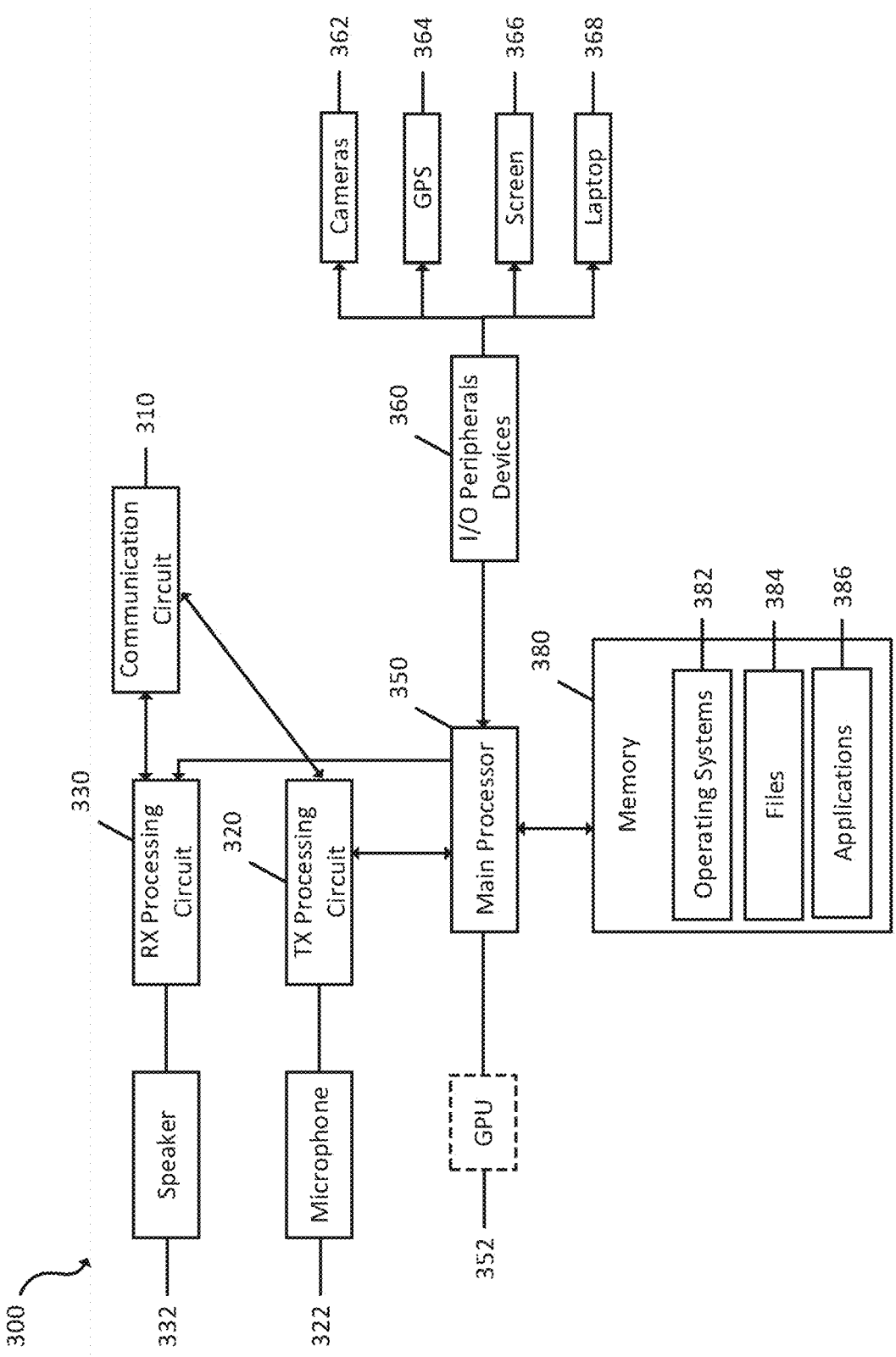
FIG. 4B depicts an exemplary architecture of an electronic device on which a user may install one or more messaging applications, creating or logging into their user account established on the specific messaging application.

FIG. 4B depicts a non-limiting example of an electronic device on which a user may install one or more messaging applications, creating or logging into their user account established on the specific messaging application. This user account on the electronic device may then communicate via third party applications with the central messaging platform as depicted in FIG. 1.

It would be appreciated that FIG. 4B is merely exemplary and non-limiting example of such an electronic device; and other configurations would also be possible.

As shown in the exemplary device depicted in FIG. 4B, the device 300 may include a communication unit 310, transmission (TX) processing circuitry 320, a microphone 322, and receiving (RX) processing circuitry 330. The device depicted 300 also includes a speaker 332, a main processor 350, an input/output (I/O) interface (IF) 360, input/output device(s), and a memory 380.

The memory 380 depicted includes an operating system (OS) program 382, file storage 384 and application files 386. The memory 380 is coupled to the main processor 350 and may include a random access memory (RAM) part, and as well as flash memory or other read-only memory (ROM) part.

The communication unit 310 is configured to receive an incoming RF signal, for example, a near field communication signal such as a BLUETOOTH® or WI-FI™ signal. The communication unit 310 converts the incoming RF signal and provides the signal to the RX processing circuitry 330. This circuitry generates a processed baseband signal by filtering, decoding, or digitizing the signal; transmitting the processed signal to the speaker 332 (such as for voice data) or to the main processor 350 for further processing (such as for web browsing data, notification data, or other message data).

The TX processing circuitry 320 receives analog or digital voice data from the microphone 322 or other outgoing baseband data (such as web data, e-mail, or interactive video game data) from the main processor 350. The TX processing circuitry 320 encodes, multiplexes, or digitizes the outgoing baseband data to generate a processed signal. The communication unit 310 receives the processed signal from the TX processing circuitry 320 and converts this signal to an RF signal for transmission.

The main processor 350 can include one or more processors or other processing devices and execute the operating system 382 stored in the memory 380 in order to control the overall operation of the device 300. For example, the operating system executing on the main processor 350 may control reception of forward channel signals and the transmission of reverse channel signals by the communication unit 310, the RX processing circuitry 330, and the TX processing circuitry 320 as is known in the art, and usually includes at least one microprocessor or microcontroller.

The main processor 350 executes processes and programs retrieved/sent to and from the memory 380. In some embodiments, the main processor 350 is configured to execute the applications 386 based on the OS program 382 separately, or together with or in addition to response to input from a user of the applications 386. The main processor 350 may also be coupled to the I/O interface 360, to receive these user inputs and input from other hardware of additional devices or other devices such as laptop computers and handheld computers.

The main processor 350 depicted is also coupled to multiple the input/output sources, for receiving data and commands from the operator. Input/output device(s) can include keyboards, touch screens, or other devices providing interaction with the electronic device 300 to the user. In some embodiments, input/output device(s) can include a touch panel, a virtual reality headset, a (digital) pen sensor, a key, or other input device.

Input/output device(s)s can include one or more screens 366, which can be a liquid crystal display, light-emitting diode (LED) display, an optical LED (OLED), an active matrix OLED (AMOLED), or other screens providing graphics.

Although FIG. 4B illustrates one example of a device 300 for providing a messaging application it would be appreciated that this arrangement is exemplary, and the device could include any number of components in any suitable arrangement. In general, devices including computing and communication systems come in a wide variety of configurations, and FIG. 1 does not limit the scope of this disclosure to any particular configuration The arrangement described in the present disclosure enables a single company to have a group chat (messaging between multiple participants) using different platforms and/or geographies and avoids the need for installation of a specific mobile application (either provided by the company or any consumer facing application). As taught in the present disclosure, participants are no longer bound to a single messaging network which enables flexibility of employees for using secure and compliant applications, which can be monitored by the employer to communicate on various messaging platforms. Furthermore, as described in the present disclosure, the data comprising these communications can be retained and analysed by the company, rather than being confined to the devices taking part in the conversation as is the case with pre-existing arrangements.

The above embodiments are described by way of example only. Many variations are possible without departing from the scope of the invention as defined in the appended claims.

For clarity of explanation, in some instances the present technology may be presented as including individual functional blocks including functional blocks comprising devices, device components, steps or routines in a method embodied in software, or combinations of hardware and software.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information were used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A communication system for communicating messages between a group comprising a plurality of user accounts on a plurality of communication channels, wherein at least some user accounts operate on a first communication channel and at least some of the other user accounts operate on at least a second communication channel different from the first communication channel, the system comprising:
    a plurality of integration modules, wherein one or more integration modules are associated with a unique communication channel of the plurality of communication channels;
    a plurality of binding data stores comprising associations between communication channel user account identification information and central messaging module user account identification information, wherein one or more binding data stores are associated with a unique integration module of the plurality of integration modules;
    one or more central data stores comprising associations between the central messaging module user account identification information, membership of at least some of the user accounts in one or more groups, the plurality of communication channels; and
    a central messaging module communicatively coupled to the one or more central data stores and configured to:
        receive messages from a user account of the group via a corresponding integration module,
        identify one or more communication channels associated with the central messaging module user account identification information for the other user accounts based on the central data stores associations, and
        send the messages to one or more of the plurality of integration modules corresponding to the other user accounts in the group,
    wherein the one or more of the plurality of integration modules send the messages to the other user accounts based on the binding data stores associations.

2. The communication system for communicating messages between the plurality of user accounts as claimed in claim 1, wherein the one or more central data stores comprise associations between a specified central messaging module user account and one or more communication channels associated with the specified central messaging module user account.

3. The communication system for communicating messages between the plurality of user accounts as claimed in claim 1, wherein the plurality of binding data stores comprise associations between a specified central messaging module user account and a specified communication channel user account.

4. The communication system for communicating messages between the plurality of user accounts as claimed in claim 1, wherein a specified communication channel user account is accessible to the central messaging module via each integration module associated with a specified communication channel of the specified user account.

5. The communication system for communicating messages between the plurality of user accounts as claimed in claim 1, wherein the central messaging module is configured to store in at least one or more data stores all messages transmitted between the user accounts of the group.

6. The communication system for communicating messages between the plurality of user accounts as claimed in claim 1, wherein the central messaging module is configured to associate each central messaging module user account of the group with an integration module for sending and receiving messages to the group.

7. The communication system for communicating messages between the plurality of user accounts as claimed in claim 1, wherein the plurality of communication channels are instant messaging applications capable of transmitting and receiving messages to and from communication channel user accounts thereof.

8. The communication system for communicating messages between the plurality of user accounts as claimed in claim 1, wherein the central messaging module further comprises an access control module, which constrains user access to messages of at least one of the one or more groups.

9. The communication system for communicating messages between the plurality of user accounts as claimed in claim 1, further comprising an automated bot application communicatively coupled to the central messaging module configured to provide predetermined responses on an occurrence of one or more trigger events in a group chat.

10. The communication system for communicating messages between the plurality of user accounts as claimed in claim 1, further comprising an administration module for managing the membership of the at least some of the user accounts in the one or more groups.

11. The communication system for communicating messages between the plurality of user accounts as claimed in claim 1, wherein the plurality of user accounts comprises a first user using the first communication channel and a second user using the second communication channel, wherein the first communication channel and the second communication channel are different.

12. The communication system for communicating messages between the plurality of user accounts as claimed in claim 1, wherein one or more of the messages include communication channel user account details appended or prepended thereto for display on the plurality of communication channels.

13. The communication system for communicating messages between the plurality of user accounts as claimed in claim 1, further comprising:
    an administration module that creates the group; and
    in response to the administration module creating the group, the central messaging module determines corresponding communication channels for the plurality of user accounts and sends a plurality of notification messages to the plurality of user accounts in the group via one or more corresponding integration modules.

14. A method of communicating messages between a group comprising a plurality of user accounts on a plurality of communication channels, wherein at least some user accounts operate on a first communication channel and at least some of the other user accounts operate on at least a second communication channel different from the first communication channel, the method comprising:
  associating one or more integration modules of a plurality of integration modules with each channel of the plurality of communication channels;
  storing, in a plurality of binding data stores, associations between communication channel user account identification information and central messaging module user account identification information, wherein one or more binding databases are associated with a unique integration module of the plurality of integration modules;
  storing, in one or more central data stores, central messaging module user account identification information, membership of at least some of the user accounts in one or more groups, and the plurality of communication channels;
  receiving messages at a central messaging module communicatively coupled to the one or more central data stores, wherein the messages are received from a user account of the group via a corresponding integration modules,
  identifying, at the central messaging module, one or more communication channels associated with the central messaging module user account identification information for the other user accounts based on the central data stores associations;
  sending, from the central messaging module, the messages to one or more of the plurality of integration modules corresponding to the other user accounts in the group,
  sending, from the one or more of the plurality of integration modules, the messages to the other user accounts based on the binding data store associations.

15. The method of communicating messages between the group comprising the plurality of user accounts on the plurality of communication channels as claimed in claim 14, wherein the one or more central data stores comprise associations between a specified central messaging module user account and one or more communication channels associated with the specified central messaging module user account.

16. The method of communicating messages between the group comprising the plurality of user accounts on the plurality of communication channels as claimed in claim 14, wherein the plurality of binding data stores comprise associations between a specified central messaging module user account and a specified communication channel.

17. The method of communicating messages between the group comprising the plurality of user accounts on the plurality of communication channels as claimed in claim 14, wherein a specified communication channel user account is accessible to the central messaging module via each integration module associated with a specified communication channel of the specified user account.

18. The method of communicating messages between the group comprising the plurality of user accounts on the plurality of communication channels as claimed in claim 14, wherein the central messaging module associates each central messaging module user account of the group with an integration module for sending and receiving messages to the group.

19. The method of communicating messages between the group comprising the plurality of user accounts on the plurality of communication channels as claimed in claim 14, wherein the plurality of communication channels are instant messaging applications capable of transmitting and receiving messages to and from communication channel user accounts thereof.

20. The method of communicating messages between the group comprising the plurality of user accounts on the plurality of communication channels as claimed in claim 14, wherein at least one user of the communication channel user accounts or central messaging module user accounts is an automated bot application communicatively coupled to the central messaging module and configured to provide predetermined responses on an occurrence of one or more trigger events in a group chat.

21. The method of communicating messages between the group comprising the plurality of user accounts on the plurality of communication channels as claimed in claim 14, further comprising:
  creating, by an administration module, the group;
  in response to creating the group, determining, by the central messaging module, corresponding communication channels for the plurality of user accounts; and
  sending, by the central messaging module, a plurality of notification messages to the plurality of user accounts in the group via one or more corresponding integration modules.

22. A non-transitory computer readable medium comprising program code, which when executed by a processor causes an apparatus to:
  associate one or more integration modules of a plurality of integration modules with each channel of a plurality of communication channels;
  store, in a plurality of binding data stores, associations between communication channel user account identification information and central messaging module user account identification information, wherein one or more binding databases are associated with a unique integration module of the plurality of integration modules;
  store, in one or more central data stores, central messaging module user account identification information, membership of at least some user accounts in one or more groups, and the plurality of communication channels;
  receive, at a central messaging module communicatively coupled to the one or more central data stores, messages from a communication channel user account of a first communication channel via a corresponding integration module, wherein the communication channel user account is in a group;
  identify, at the central messaging module, one or more communication channels associated with the central messaging module user account identification information for other user accounts based on the central data stores associations;
  send, from the central messaging module, the messages to one or more of the plurality of integration modules corresponding to the other user accounts in the group, wherein at least one of the other user accounts in the group is on a second communication channel different from the first communication channel;
  send, from the one or more of the plurality of integration modules, the messages to one or more of the plurality of integration modules corresponding to the other user accounts in the group;
  send, from the one or more of the plurality of integration modules, the messages to the other user accounts based on the binding data store associations.

* * * * *